United States Patent
Daugherty et al.

(10) Patent No.: US 12,450,106 B2
(45) Date of Patent: Oct. 21, 2025

(54) AUTOMATIC ACCESS CONTROL OF CALLS MADE OVER NAMED PIPES WITH OPTIONAL CALLING CONTEXT IMPERSONATION

(71) Applicant: DELL PRODUCTS L.P., Round Rock, TX (US)

(72) Inventors: Daniel Thomas Daugherty, Plano, TX (US); Ricardo Antonio Ruiz, The Colony, TX (US)

(73) Assignee: Dell Products L.P., Round Rock, TX (US)

( * ) Notice: Subject to any disclaimer, the term of this patent is extended or adjusted under 35 U.S.C. 154(b) by 631 days.

(21) Appl. No.: 17/965,541

(22) Filed: Oct. 13, 2022

(65) Prior Publication Data

US 2024/0126620 A1   Apr. 18, 2024

(51) Int. Cl.
*G06F 9/54*   (2006.01)

(52) U.S. Cl.
CPC .................................. *G06F 9/541* (2013.01)

(58) Field of Classification Search
CPC ..................................................... G06F 9/541
See application file for complete search history.

(56) References Cited

U.S. PATENT DOCUMENTS

| | | | | |
|---|---|---|---|---|
| 2013/0173736 A1* | 7/2013 | Krzeminski | ........ | H04W 12/086 709/213 |
| 2019/0213322 A1* | 7/2019 | Dehon | .................. | G06F 9/4401 |
| 2021/0067341 A1* | 3/2021 | Haque | ....................... | H04L 9/14 |
| 2021/0067350 A1* | 3/2021 | McClintock | .......... | H04L 9/3263 |
| 2022/0141195 A1* | 5/2022 | Flavel | ..................... | H04L 63/04 726/4 |

OTHER PUBLICATIONS

Ruiz et al., "Sharing of Computing Resources Between Computing Processes of an Information Handling System", U.S. Appl. No. 17/231,384, filed Apr. 15, 2021, 26 pgs.
Microsoft, Attributes (C#), Microsoft.com, Mar. 11, 2022, 6 pgs.

\* cited by examiner

*Primary Examiner* — Kevin L Young
*Assistant Examiner* — Phuong N Hoang
(74) *Attorney, Agent, or Firm* — Egan, Enders & Huston LLP

(57) ABSTRACT

Systems and methods are provided for automatically filtering privileged methods from unprivileged methods, and thus preventing privileged methods from being available to an unelevated consumer application executing on an information handling system. Filtering privileged methods from unprivileged methods may be performed, for example, by identifying any unprivileged method/s within an original implementation class of an elevated publisher software application that are eligible to be exposed to (e.g., shared with) an unelevated consumer software application via a named pipe, and implementing a corresponding dynamic publisher object on the elevated publisher software application and an intermediary dynamic consumer proxy class on the unelevated consumer software application to prevent the unelevated consumer software application from calling any other methods (e.g., privileged method/s) within the original implementation class of the elevated publisher software application that are not so identified as being eligible to be exposed to the unelevated consumer software application.

20 Claims, 8 Drawing Sheets

AUTOMATIC ACCESS CONTROL OF CALLS MADE OVER NAMED PIPES WITH OPTIONAL CALLING CONTEXT IMPERSONATION

FIELD OF THE INVENTION

This application relates to information handling systems and, more particularly, to calls made between applications executing on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Elevated software applications are applications that execute on an information handling system with elevated privileges. Elevated applications may share specific methods and functionality with different unelevated applications via inter-process communication (IPC), for example, named pipes. However, it is not desirable to expose privileged methods as remote procedure calls to such unelevated applications. This is because an attacker can potentially take advantage of a vulnerability created when a privileged method is exposed to an unelevated application by mistake.

In the past, tools such as Microsoft .NET Code Access Security and Microsoft Windows Communication Foundation (WCF) have been executed on a server to restrict access by a client to sensitive methods such as sensitive application programming interfaces (APIs) running on the server via Code Access Security attributes, i.e., by running on the server to reject calls that are received at the server from unelevated applications running outside the server. Using such tools, a sensitive method still exists in the available API and can still be invoked by the client (or any user that can connect to the IPC pipe) if its corresponding Code Access Security attribute is removed.

SUMMARY OF THE INVENTION

Disclosed herein are systems and methods for automatically filtering (or separating out) privileged methods (e.g., such as application programming interfaces "APIs") from unprivileged methods, and thus preventing privileged methods from being available to an unelevated application executing on an information handling system. In one embodiment, filtering privileged methods from unprivileged methods may be performed by identifying any unprivileged method/s within an original implementation class of an elevated publisher software application that are eligible to be exposed to (e.g., shared with) an unelevated consumer software application via an inter-process communication (IPC) named pipe, and implementing a corresponding dynamic publisher object on the elevated publisher software application and an intermediary dynamic consumer proxy class on the unelevated consumer software application to prevent the unelevated consumer software application from calling (e.g., via remote procedure call/s) any other methods (e.g., privileged method/s) within the original implementation class of the elevated publisher software application that are not so identified as being eligible to be exposed to the unelevated consumer software application. In one embodiment, any methods (e.g., privileged method/s) within the original implementation class of the elevated publisher software application that are not so identified as being eligible to be exposed to the unelevated consumer software application are never published across the IPC of the named pipe to the unelevated consumer application and do not exist in the intermediary dynamic consumer proxy class created on the unelevated consumer application.

An elevated application is an application that executes on an information handling system with elevated privileges that are not accorded to unelevated applications executing on the information handling system. In particular, an elevated application executes on a higher plane of protection (e.g., to protect it from malware) and with a higher level of trust than does an unelevated application that executes on a lower plane of protection and with a lower level of trust. A privileged method may be, for example, an application programming interface (API) or other code that performs sensitive operations that are not performed (or allowed to be performed) by unprivileged methods. Examples of such sensitive actions that may be performed by a privileged method include, but are not limited to, accessing sensitive data on an information handling system. Just one example of such a privileged method is an API that reads all passwords stored and/or entered into an information handling system.

In one embodiment, a separate interface may be dynamically created between an elevated publisher (e.g., server) application and an unelevated consumer (e.g., client) application. The separate interface may include a publisher dynamic object that is dynamically created at runtime on the elevated publisher application and a corresponding intermediary dynamic consumer proxy class that is published by the elevated publisher application over an IPC named pipe to the unelevated consumer application. The published intermediary dynamic consumer proxy class may then be dynamically created at runtime within the unelevated consumer application to clearly separate and exclude all methods from being published to the unelevated application by default except for any method/s that are clearly identified (e.g., by a developer of the software code) as being eligible for unprivileged access.

In one embodiment, a dynamically-created dynamic consumer proxy class that is created on an unelevated consumer application may operate to filter and forward only those IPC method calls (e.g., remote procedure calls) made from the unelevated consumer application to an original implementation class (e.g., that includes one or more privileged method/s) of the elevated publisher application that correspond to the identified shareable unprivileged method/s of the elevated publisher application. In this way, a clear separation of concerns may be created between the original implementation class of the publisher application and the dynamically-created dynamic consumer proxy class of the consumer application, and may be used to filter or otherwise prevent the unelevated consumer application from accidently having access to one or more privileged method/s of the original implementation class of the elevated publisher application, i.e., any method/s not actively identified as eligible for unprivileged access by an unelevated consumer application will not exist in the dynamic consumer proxy class that is published over the IPC and therefore will not be available to the IPC named pipe and the unelevated consumer application since it is never published over the named pipe.

In one embodiment, an intermediary dynamic consumer proxy class of the unelevated consumer application may be dynamically created to only include those identified shareable unprivileged method/s of the publisher elevated application. If the unelevated consumer application attempts to invoke or otherwise call an identified privileged method of the publisher elevated application via IPC, the caller (e.g., the unelevated consumer application) will receive an exception because the privileged method will not exist in the dynamically-created intermediary dynamic consumer proxy class of the IPC system. When the unelevated consuming application invokes an unprivileged method, the request will be invoked over the IPC mechanism to the elevated publisher application via the dynamically-created layer of the intermediary dynamic consumer proxy class.

Advantageously, the disclosed systems and methods may be implemented in one embodiment to allow placement of privileged and unprivileged methods in the same object, and optionally to implement user-specific access rights, e.g., to provide an easy-to-use access management technology to existing remote procedure call (RPC)-based Inter-Process Communication systems in a way that reduces software development design time as well as rework when requirements change. Additionally, security or code development personnel may search text objects for all methods that are designated as unprivileged, e.g., to assist these personnel in pin-pointing what specific methods are exposed to an unelevated process/es.

In another embodiment, more complex access rights requirements (e.g., such as per-user requirements) may be optionally supported and enabled by dynamically creating a context switch within the elevated publisher application to impersonate the calling context from the unelevated consumer application, e.g., so that the implementation of the remote procedure call of the IPC is executed within the elevated publisher application in the context of the unelevated consumer application, i.e., rather than being executed in the context of the elevated publisher application as would otherwise be the case.

In one embodiment, using the disclosed systems and methods allows changes in status of a given method of an elevated publisher application (e.g., from privileged to unprivileged, for from unprivileged to privileged) to be implemented during development of software code without requiring reorganization of the software code. Such reorganizing of the software code during development incurs additional expense in development time and security reviews.

In one respect, disclosed herein is a method, including using at least one programmable integrated circuit to: execute an elevated publisher application and a consumer application, the elevated publish application communicating with the consumer application via an inter-process communication (IPC) connection with the consumer application; execute the elevated publisher application to load an original implementation class of the elevated publisher application, one or more methods of the elevated publisher application being marked by the original implementation class to be unprivileged methods that are eligible for exposure to an unelevated consumer application; execute the consumer application to attempt a call across the IPC connection for at least a given one of the methods of the elevated publisher application; and then respond to the attempted call by the consumer application for the at least one given method of the elevated publisher application by either: invoking the at least one given method on the elevated publisher application if the consumer application is an elevated consumer application, or invoking the at least one given method on the elevated publisher application if the consumer application is an unelevated consumer application only if the at least one given method on the elevated publisher application is one of the unprivileged methods included in the dynamic proxy class that is determined to be marked as eligible for exposure to the unelevated consumer application.

In another respect, disclosed herein is a system, including at least one programmable integrated circuit that is programmed to: execute an elevated publisher application and a consumer application, the elevated publish application communicating with the consumer application via an inter-process communication (IPC) connection with the consumer application; execute the elevated publisher application to load an original implementation class of the elevated publisher application, one or more methods of the elevated publisher application being marked by the original implementation class to be unprivileged methods that are eligible for exposure to an unelevated consumer application; execute the consumer application to attempt a call across the IPC connection for at least a given one of the methods of the elevated publisher application; and then respond to the attempted call by the consumer application for the at least one given method of the elevated publisher application by either: invoking the at least one given method on the elevated publisher application if the consumer application is an elevated consumer application, or invoking the at least one given method on the elevated publisher application if the consumer application is an unelevated consumer application only if the at least one given method on the elevated publisher application is one of the unprivileged methods included in the dynamic proxy class that is determined to be marked as eligible for exposure to the unelevated consumer application.

DESCRIPTION OF ILLUSTRATIVE EMBODIMENTS

Figure 1:
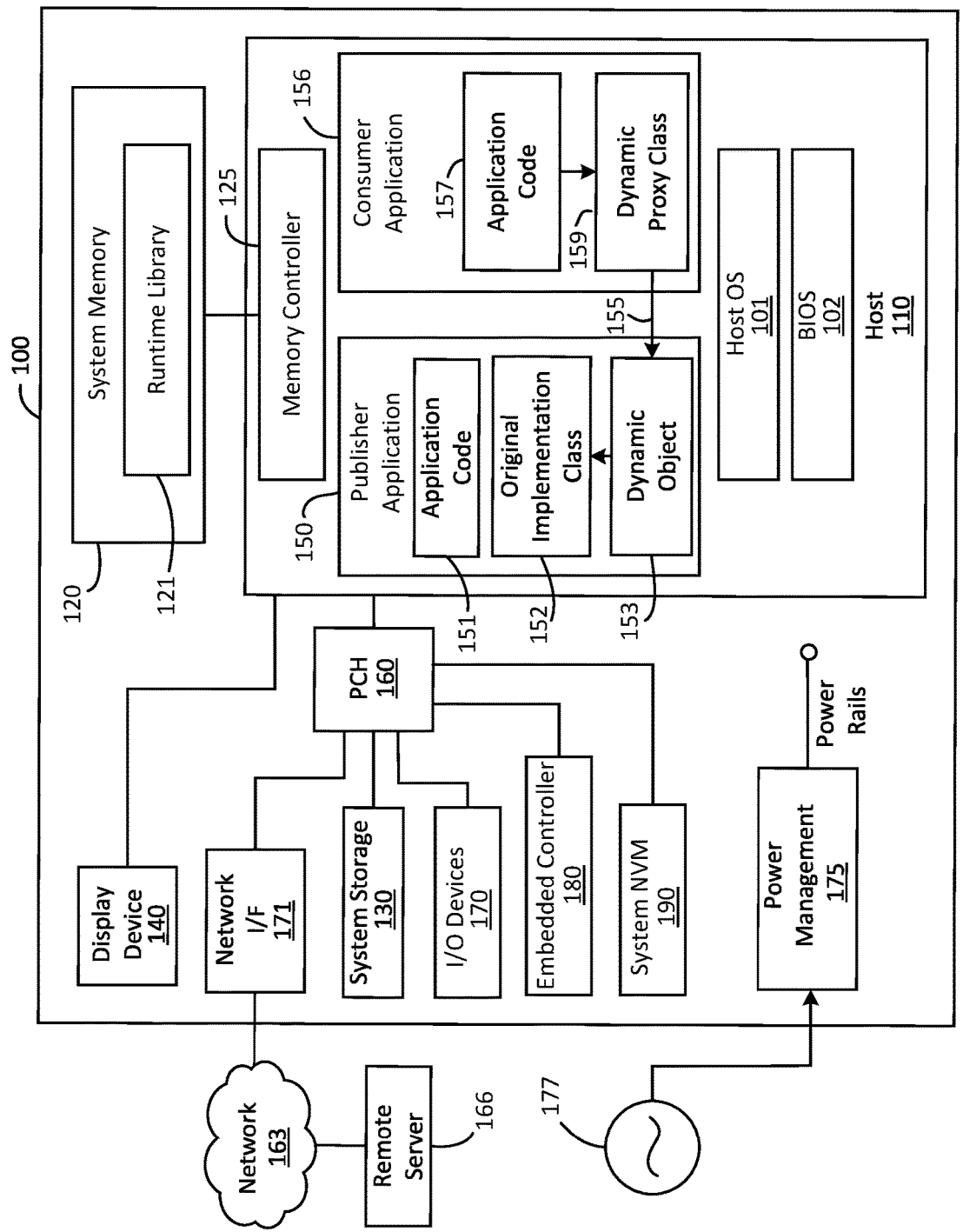
FIG. 1 illustrates a block diagram of an information handling system according to one exemplary embodiment of the disclosed systems and methods.

FIG. 1 is a block diagram of an information handling system 100 (e.g., a desktop or all-in-one computer, computer server, laptop or notebook computer, tablet or convertible computer, etc.) as it may be optionally coupled via a network 163 to at least one other information handling system 166 (e.g., such as a remote computer server) according to one embodiment of the disclosed systems and methods. In this regard, it should be understood that the configuration of FIG. 1 is exemplary only, and that the disclosed methods may be implemented on other types and/or configuration of information handling systems. It should be further understood that while certain devices and components of an information handling system are shown in FIG. 1 for illustrating embodiments of the disclosed systems and methods, the information handling system is not restricted to including only those devices and components shown in FIG. 1 and described below.

As shown in FIG. 1, information handling system 100 may include a host programmable integrated circuit 110 that executes a host operating system (OS) 101 (e.g., such as Microsoft Windows 10, Linux, etc.) and unified extensible firmware interface BIOS 102 (e.g., unified extensible firmware interface BIOS) for system 100, and other code that includes at least one unelevated consumer (client) application 156 communicating with at least one elevated publisher (e.g., server) application 150 through unelevated IPC named pipe 155 across process boundary 167 that exists between elevated publisher application 150 and unelevated consumer application 156. For example, unelevated consumer (e.g., client) application 156 may be an unelevated antivirus software application or unelevated client user interface that is obtaining status information through an unelevated IPC 155 named pipe from an elevated service application 150. Examples of such an elevated service application 150 include, but are not limited to, a Windows Service which optimizes the performance of the hardware and can access privileged functions such as BIOS settings, driver interop and OS administrative functions, a service which provides access to an encrypted and administrator-protected database, a service which can attempt privileged OS actions in order to remediate identified issues with the host, a service that can interact with protected BIOS settings to overclock a gaming personal computer (PC), etc.

Although, in the embodiment of FIG. 1, unelevated consumer (e.g., client) application 156 and elevated publisher (e.g., server) application 150 are executing on the same host OS 101 of a single common information handling system 100, it will be understood that in other embodiments an elevated publisher (e.g., server) application 150 may be executing on a separate and different (e.g., remote) information handling system from an unelevated consumer (e.g., client) application 156 that is communicating with the elevated publisher (e.g., server) application 150, e.g., an unelevated consumer (e.g., client) application 156 may be executing on a local (e.g., client) information handling system that communicates across network 163 with an elevated publisher (e.g., server) application 150 executing on a separate host OS of a remote server 166 which in one embodiment may be configured with similar components as described herein for information handling system 100.

Still referring to the embodiment of FIG. 1, host programmable integrated circuit 110 may include any type of processing device, such as an Intel central processing unit (CPU), an Advanced Micro Devices (AMD) CPU or another programmable integrated circuit. An integrated memory controller 125 also executes within host programmable integrated circuit 110 to manage reads and writes to volatile system memory 120 (e.g., dynamic random access memory "DRAM", synchronous dynamic random-access memory "SDRAM", etc.) that is coupled as shown to host programmable integrated circuit 110. A shared runtime library 121 in system memory 120 is present to identify any unprivileged software methods (e.g., APIs) that are marked or otherwise indicated to be eligible for exposing across unelevated IPC connection 155.

In the illustrated embodiment, the publisher (e.g., server) application 150 and the consumer (e.g., client) application 156 are each executing on host programmable integrated circuit 110, and communicating with each other across an unelevated inter-process communication (IPC) named pipe 155 that is established between publisher application 150 and consumer application 156. As shown, application code of publisher application 156 includes an original implementation class 152 as compiled object code, and consumer application 156 includes its specific application code 157 as compiled object code. As described further herein, a publisher dynamic object 153 is dynamically created during runtime (e.g., within system volatile memory 120) as an object in elevated publisher application 150 using shared runtime library 121, and a dynamic consumer proxy class 159 is dynamically created during runtime (e.g., within system volatile memory 120) as an object in unelevated consumer application 156 using shared runtime library 121.

Still referring to FIG. 1, host programmable integrated circuit 110 may be coupled to an external or internal (integrated) display device 140 (e.g., LCD or LED display or other suitable display device) depending on the particular configuration of information handling system 100. In the illustrated embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

In the embodiment of FIG. 1, a platform controller hub (PCH) 160 is coupled to control certain data paths and manage information flow between devices and components of the information handling system 100. As such, PCH 160 may include one or more integrated controllers/microcontrollers and/or interfaces for controlling the data paths connecting PCH 160 with host programmable integrated circuit 110, system storage 130 (e.g., one or more media drives, such as hard disk drives, optical drives, NVRAM, Flash memory, solid state drives "SSDs", and/or any other suitable form of internal or external storage), external and/or integrated input/output (I/O) devices 170 (e.g., such as one or more of touchpad, keyboard, mouse, touchscreen and associated controllers thereof) forming at least a part of a user interface for the information handling system. In the embodiment of FIG. 1, I/O devices 170 may be coupled to PCH 160 of system 100 to enable a system user to input data and interact with information handling system 100, and to interact with application programs or other software/firmware executing thereon.

Also shown in FIG. 1 are other components of system 100 that may include network interface (I/F) device 171, system NVM 190 (e.g., serial peripheral interface (SPI) Flash memory) which stores firmware images and other code for operation of system 100, and embedded controller (EC) 180 that may be configured with a microcontroller or other programmable integrated circuit to perform functions such as power/thermal system management and to execute program instructions to boot information handling system 100, etc.

In one embodiment, PCH 160 may include a Serial Peripheral Interface (SPI) controller and an Enhanced Serial Peripheral Interface (eSPI) controller. In some embodiments, PCH 160 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

Figure 2:
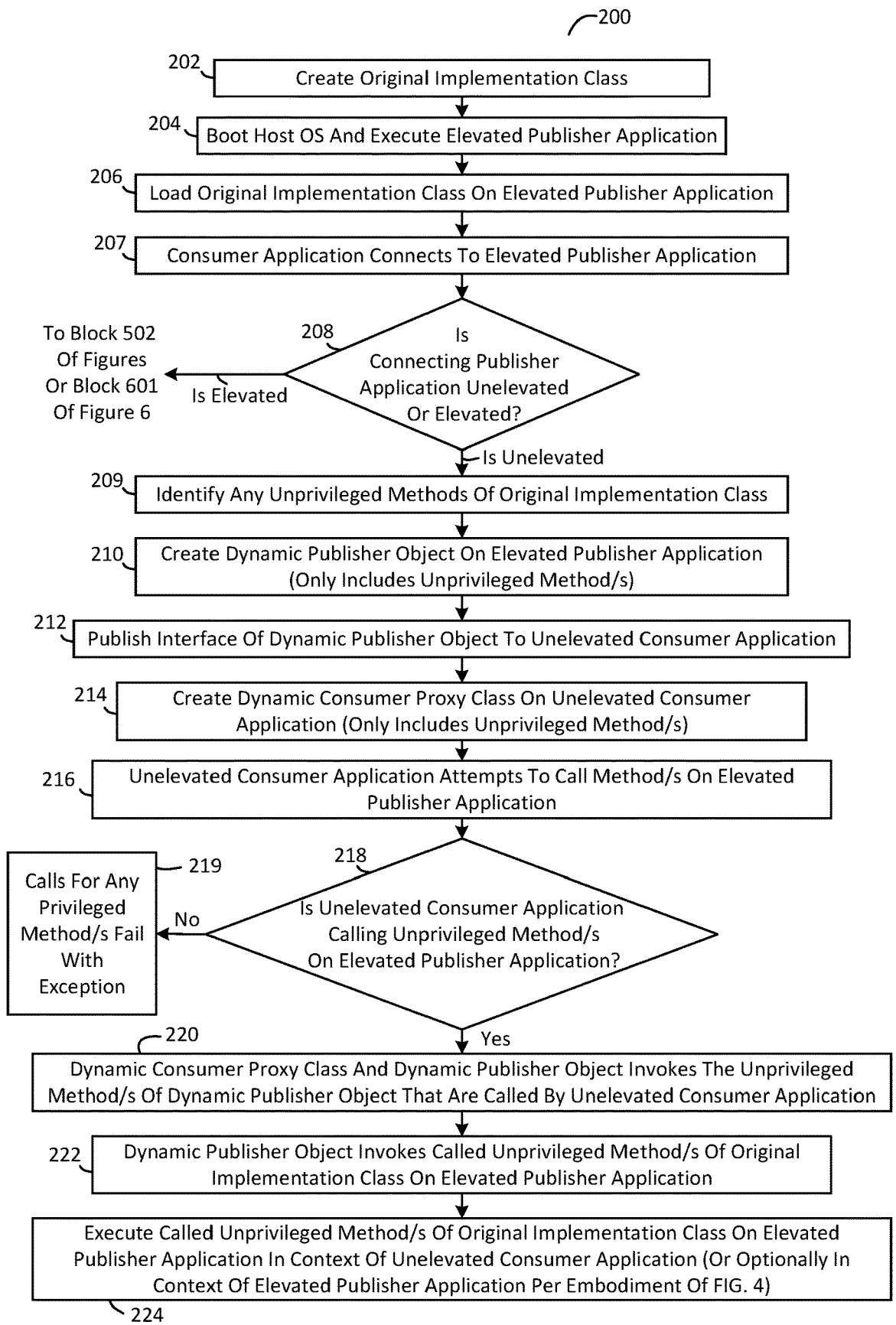
FIG. 2 illustrates a methodology according to one exemplary embodiment of the disclosed systems and methods.

FIG. 2 illustrates methodology 200 according to one exemplary embodiment of the disclosed systems and methods. FIG. 2 is described below in relation to the exemplary embodiments of FIGS. 3 and 7, although methodology 200 may be similarly implemented with any other suitable configuration of an elevated application that is communicating with an unelevated application, e.g., such as an elevated application executing on a remote server 166 and communicating via an unelevated IPC 155 across network 163 with an unelevated application executing on a local client system 100.

As shown in FIG. 2, methodology 200 starts in block 202 where an original implementation class 152 is created (e.g., by a software developer during software development phase) for elevated publisher application 150 which contains a set of software methods (e.g., APIs), all of which are eligible for exposure (i.e., allowed to be exposed) by an elevated publisher application 150 over an elevated IPC system (including an elevated IPC) to elevated consumer applications via remote procedure calls (RPCs). Also during block 202, a subset of one or more of the software methods of the created original implementation class 152 may be selected and selectively marked (e.g., decorated) in the created class 152 with eligibility markings that indicate that they are unprivileged methods that are also eligible for exposure over an unelevated IPC system, such as for exposure to unelevated consumer application 156 across unelevated IPC 155 of FIG. 2. Any remaining software methods that are not marked as unprivileged methods eligible for exposure to an unelevated consumer application are considered indicated to be privileged methods that are only to be exposed across an elevated IPC and IPC system to another elevated application.

Examples of types of markings that may be employed as eligibility markings to "mark" a given method as eligible for exposure to an unelevated consumer application include, but are not limited to, custom Attributes (C #) that may be created in .Net, and other custom Attributes that are allowed be created in different programming languages. Examples of specific eligibility markings such as may be created in block 202 are:

[Unprivileged]
public Result ThisIsAnAPIMethod( );

It will be understood that other marking schemes may alternatively be employed, e.g., such as by marking privileged methods with eligibility markings that indicate that the marked methods are privileged methods in which case the remaining unmarked methods are considered indicated to be unprivileged methods that are eligible for unelevated application exposure, marking each given method of the elevated publisher application 150 with either a privileged eligibility marking indicating the given method is ineligible for unelevated application exposure marking or an unprivileged eligibility marking indicating the given method is eligible for unelevated application exposure, etc.). In any case, the created elevated publisher application 150 of block 202 is included (with its eligibility markings) as a compiled object within the application code 151 of elevated publisher application 150, which is then deployed on information handling system 100.

Next, in block 204, information handling system 100 is booted to host OS 101, and execution of the application code 151 of elevated publisher application 150 is started on host programmable integrated circuit 110. In block 206, the executing elevated publisher application 150 loads the original implementation class 152 that includes all elevated and unprivileged methods that are selected as described in block 202. This created original implementation class 152 also includes the eligibility markings of block 202 that differentiate between those methods that are considered unprivileged methods eligible for exposure to unelevated applications and those methods that are considered ineligible for exposure to unelevated applications (e.g., privileged methods).

In block 207, application code 157 of a connecting application is started (or may already be started and running) on host programmable integrated circuit 110, and connects to the executing elevated publisher application 150 via unelevated IPC 155.

In block 208, elevated publisher application 150 determines whether the current connecting application is an unelevated consumer application 156 connecting by an unelevated IPC 155 or is an elevated application 156 that is connecting by an elevated IPC 755. If elevated publisher application 150 determines in block 208 that the current connecting application is an unelevated consumer application 156 connecting by an unelevated IPC (e.g., such as unelevated consumer application 156 connecting by unelevated IPC 155 of FIG. 3), then methodology 200 proceeds to block 208. However, if elevated publisher application 150 determines in block 208 that the current connecting application is an elevated consumer application that is connecting by an elevated IPC (e.g., such as elevated application 156 connecting by elevated IPC 755 of FIG. 7), then methodology 200 proceeds to either block 502 of methodology 500 of FIG. 5, or to block 602 of optional methodology 600 of FIG. 6, each of which is described further herein.

In block 209, code of runtime library 121 (e.g., .Net Runtime) is executed by elevated publisher application 150 to inspect original implementation class 152 of elevated publisher application 150 to determine if any methods of original implementation class 152 are indicated by the eligibility markings of original implementation class 152 to be unprivileged methods that are eligible for exposure on the unelevated IPC connection, e.g., for exposure to unelevated consumer application 156.

Figure 3:
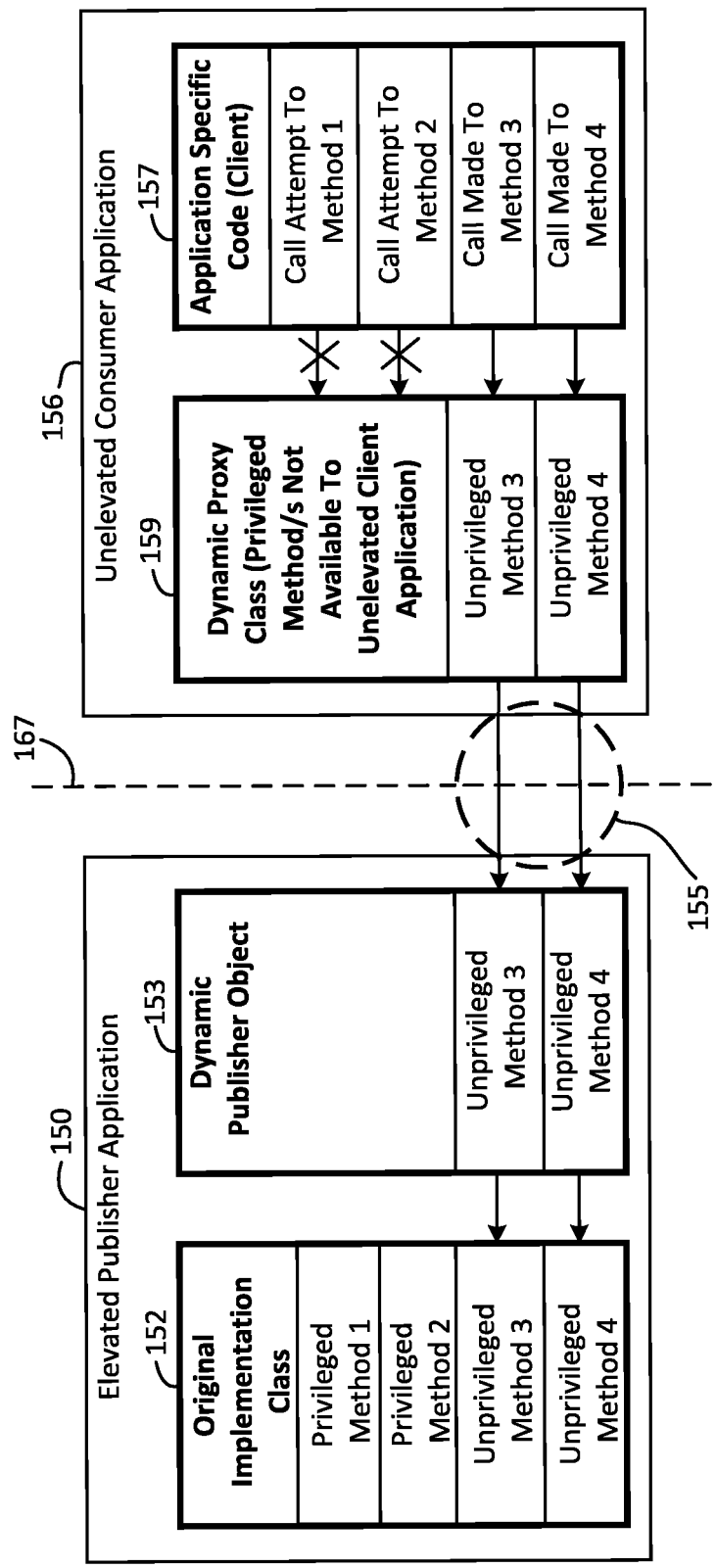
FIG. 3 illustrates an elevated publisher application and an unelevated consumer application according to one exemplary embodiment of the disclosed systems and methods.

Next, in block 210, elevated publisher application 150 dynamically creates (during runtime) a new interface in the form of dynamic publisher object 153. As shown in FIG. 3, dynamic publisher object 153 is so created to include any and all of those methods indicated by the eligibility markings of original implantation class 152 as being unprivileged methods eligible for exposure to unelevated applications and to not include any of the remaining methods (e.g., privileged methods that are ineligible for exposure to unelevated applications), i.e., dynamic publisher object 153 is created to include only the unprivileged methods marked as eligible for exposure to unelevated applications. In the event that no methods of original implementation class 152 are indicated by the eligibility markings of original implementation class 152 as being unprivileged methods eligible for exposure to unelevated applications, then the created dynamic publisher object 153 is created to include no methods of original implantation class 152. Thus, dynamic publisher object 153 implements a filter of the unelevated consumer application 156 by omitting the privileged methods that are ineligible for exposure to unelevated applications so that they cannot be invoked or called across unelevated IPC 155.

In an alternate embodiment, when no methods of original implementation class 152 are indicated by the eligibility markings of original implementation class 152 as being unprivileged methods that are eligible for exposure to unelevated applications, then the action of publishing is halted and the dynamic publisher object 153 is not published at all (e.g., since there is no eligible API for the unelevated consumer application 156 to access or use).

In one optional embodiment of block 210, the dynamic publisher object 153 may be optionally given an interface name that is the same as a name of the created original implementation class 152 of block 206, but with a special moniker appended to the name, e.g., if the created original implementation class 152 is named "Class1", then the created dynamic publisher object 153 may be named "Class1Unelevated".

In the exemplary embodiment of FIG. 3, dynamic publisher object 153 is implemented in block 210 as a pass-through for calls to unprivileged methods of original implementation class 152 of elevated publisher application 150, i.e., so that calls made from unelevated consumer application 156 across unelevated IPC 155 to all given unprivileged method/s of original implementation class 152 are made by default in the context of elevated publisher application 150 when it is the implementing process.

Figure 4:
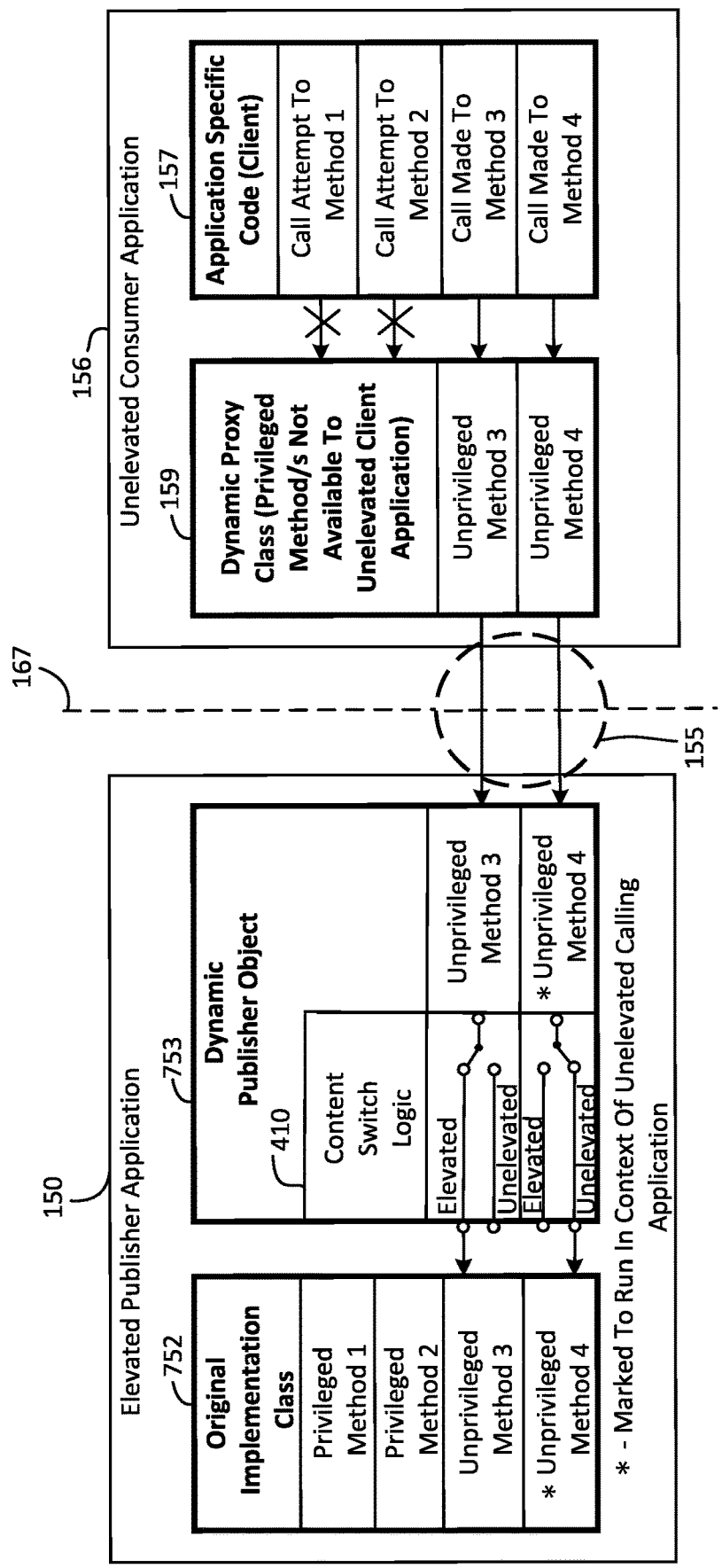
FIG. 4 illustrates an elevated publisher application and an unelevated consumer application according to one exemplary embodiment of the disclosed systems and methods.

However, in an alternate optional embodiment illustrated in FIGS. 4, a dynamic publisher object 753 may be optionally created and implemented in block 210 together with context switch logic 410 that is switched (or set) in block 210 according to context marking/s originally included for one or more selected methods of an original implementation class 752 during its creation. When a given method is so marked with a context marking for execution in the calling context in the original implementation class 752 of FIG. 4, the dynamic publisher object 753 responds to this context marking by controlling context switch logic 410 to impersonate the execution context of the calling process of unelevated consumer application 156 and to call any selected (and context marked) one or more of the given unprivileged method/s of the original implementation class 752 in the context of unelevated consumer application 156. This optional embodiment of FIG. 4 advantageously allows for more granular per-user access rights for each unprivileged method of an original implementation class 752. For example, when running in the default context of elevated publisher application 150, an API that is called by a given unelevated consumer application 156 running as "User1" on elevated publisher application 150 may be allowed to access files of other users (e.g., such as another unelevated consumer application 156 running as "User2") that are on elevated publisher application 150. However, when context switch logic 410 is switched (or set) in block 210 to impersonate the execution context of the calling process of the given unelevated consumer application 156 running as "User1", then the same API that is called by "User1" on elevated publisher application 150 runs on elevated publisher application 150 in the context of unelevated consumer application 156 and is prevented from accessing the files of other users (e.g., such as another unelevated consumer application 156 running as "User2") that are on elevated publisher application 150.

Next, in block 212 of methodology 200, the interface of created dynamic publisher object 153 is published by elevated publisher application 150 to unelevated consumer application 156 via the unelevated IPC connection 155, e.g., as remote procedure calls. Therefore, in block 212 only identified privileged method/s of original implementation class 152 that are marked as eligible for exposure to unelevated applications that are included in dynamic publisher object 153 are published across the unelevated IPC 155. No privileged method/s (that are ineligible for exposure to unelevated applications) of original implementation class 152 of elevated publisher application 150 are published across the unelevated IPC 155.

Next, in block 214, unelevated consumer application 156 dynamically generates (during runtime) an implementation of published dynamic publisher object 153 as dynamic consumer proxy class 159, e.g., that includes all those methods indicated by the eligibility markings of original implantation class 152 as being unprivileged methods eligible for exposure to unelevated applications and so as not to include any of the remaining methods (e.g., including privileged methods that are ineligible for exposure to unelevated applications). In this embodiment, application code 157 of unelevated consumer application 156 must make all calls for methods on elevated publisher application 150 via dynamic proxy class 152. Thus, only unprivileged methods that are marked as eligible for exposure to unelevated applications are exposed to application code 157 of unelevated consumer application 156 by dynamic publisher object 153. The remaining method/s of original implementation class 152 of elevated publisher application 150 do not exist in the dynamic consumer proxy class 159 created on the unelevated consumer application 156. If no methods are indicated by the eligibility markings of original implantation class 152 as being unprivileged methods eligible for exposure to unelevated applications, then dynamic proxy class 159 includes no methods that may called or invoked by application code 107 of unelevated consumer application 159, i.e., unelevated consumer application 156 can not successfully make any method calls across unelevated IPC 155 to elevated publisher application 150.

As previously described, in an alternative embodiment, when no methods are indicated by the eligibility markings of original implantation class 152 as being unprivileged methods eligible for exposure to unelevated applications, then the action of publishing may be halted and the dynamic publisher object 153 is not published at all (e.g., since there is no eligible API for the unelevated consumer application 156 to use). In such a case of this alternative embodiment, unelevated consumer application 156 also generates no dynamic consumer proxy class 159.

After completion of block 214, unelevated consumer application 156 is enabled to attempt to invoke or make calls (e.g., remote procedure calls) via dynamic publisher object 153 across unelevated IPC 155 for unprivileged methods eligible for exposure to unelevated applications on elevated publisher application 150 (i.e., unelevated consumer application 156 is not enabled to attempt to invoke or make any calls for any methods on elevated publisher application 150 until completion of block 214). Unelevated consumer application 156 is not able to successfully invoke across unelevated IPC 155 any of the privileged methods of elevated publisher application 150 that are not exposed to application code 157 of unelevated consumer application 156 by dynamic publisher object 153 since these privileged methods do not exist in dynamic proxy class 159 and dynamic publisher object 153.

Next, in block 216, application code 157 of unelevated consumer application 156 attempts to invoke or make calls (e.g., remote procedure calls) via dynamic consumer proxy class 159 across unelevated IPC connection 155 for method/s on elevated publisher application 150. As shown in block 218, application code 157 of unelevated consumer application 156 may attempt to invoke or make such calls for an unprivileged or privileged method on elevated publisher application 150.

If, in block 218, application code 157 of unelevated consumer application 156 calls or invokes a given unprivileged method in dynamic consumer proxy class 159 of unelevated consumer application 156, then in block 220 dynamic consumer proxy class 159 will in turn invoke (call) the matching (corresponding) given unprivileged method across IPC 155 from dynamic publisher object 153 of elevated publisher application 150. In block 222, dynamic publisher object 153 then invokes (calls) the matching (corresponding) given unprivileged method of original implementation class 152, e.g., to execute by application code 151 of elevated publisher application 150 in the context of the elevated publisher application 150 in block 224 for the exemplary embodiment of FIG. 3, or optionally to execute in the context of either of elevated publisher application 150 or the calling unelevated consumer application 156 in the case of the embodiment of FIG. 4 as described further herein.

In the example embodiment of optional FIG. 4, context switch logic 410 may be set by default to cause dynamic publisher object 753 to invoke (call) any selected one or more of the matching (corresponding) unprivileged methods of original implementation class 752 to execute in block 224 in the context of the owning process of elevated publisher application 150, but may be set (as shown in FIG. 4) to invoke (call) any one or more of the matching unprivileged methods of original implementation class 752 that are selected (and context marked) to execute in block 224 in the context of the unelevated calling process of unelevated consumer application 156. This provides extra flexibility (e.g., to a software code developer of a server API) in terms of allowing control of per-user access rights individually for each of the unprivileged methods of original implementation class 752, e.g., to allow a software code developer of a server API to control these per-user access rights to fit the needs or requirements of a given situation.

As just an example, FIG. 4 illustrates context switch logic 410 set by default to call unmarked unprivileged method 3 to execute in block 224 in the context of the owning process of elevated publisher application 150, but set to call selected (and marked) unprivileged method 4 of original implementation class 752 to execute in block 224 in the context of the calling unelevated consumer application 156 in response to the context marking of method 4 that is included in original implementation class 752 for its execution in the calling context. In this regard, when executing a method in the context of the elevated publisher application 150, the application programming interface (e.g., server API) of the elevated publisher application 150 has access to sensitive files and may mistakenly execute actions that an unprivileged actor would not otherwise have access to, e.g., such as files that are only accessible to an administrator. However, when executing a method in the context of the unelevated consumer application 156, the API of the elevated publisher application 150 protects itself from accessing sensitive files and mistakenly executing an action which an unprivileged actor would not otherwise have access to, e.g., a file that is only accessible to an administrator would not be accessible to the API of the elevated publisher application 150 when it is running in the context of the unelevated consumer application 156.

Returning to FIG. 2, if in block 218, application code 157 of unelevated consumer application 156 attempts to call or invoke a given privileged method via dynamic proxy class 159 that is not marked eligible for exposure to unelevated applications on elevated publisher application 150, this method call will fail in block 219 with an exception thrown due to the fact that dynamic consumer proxy class 159 does not contain any privileged methods of elevated publisher application 150 that are not eligible for exposure to unelevated applications, and therefore the given privileged method is not available and not callable or invocable by unelevated consumer application 156 through the unelevated IPC 155.

Figure 5:
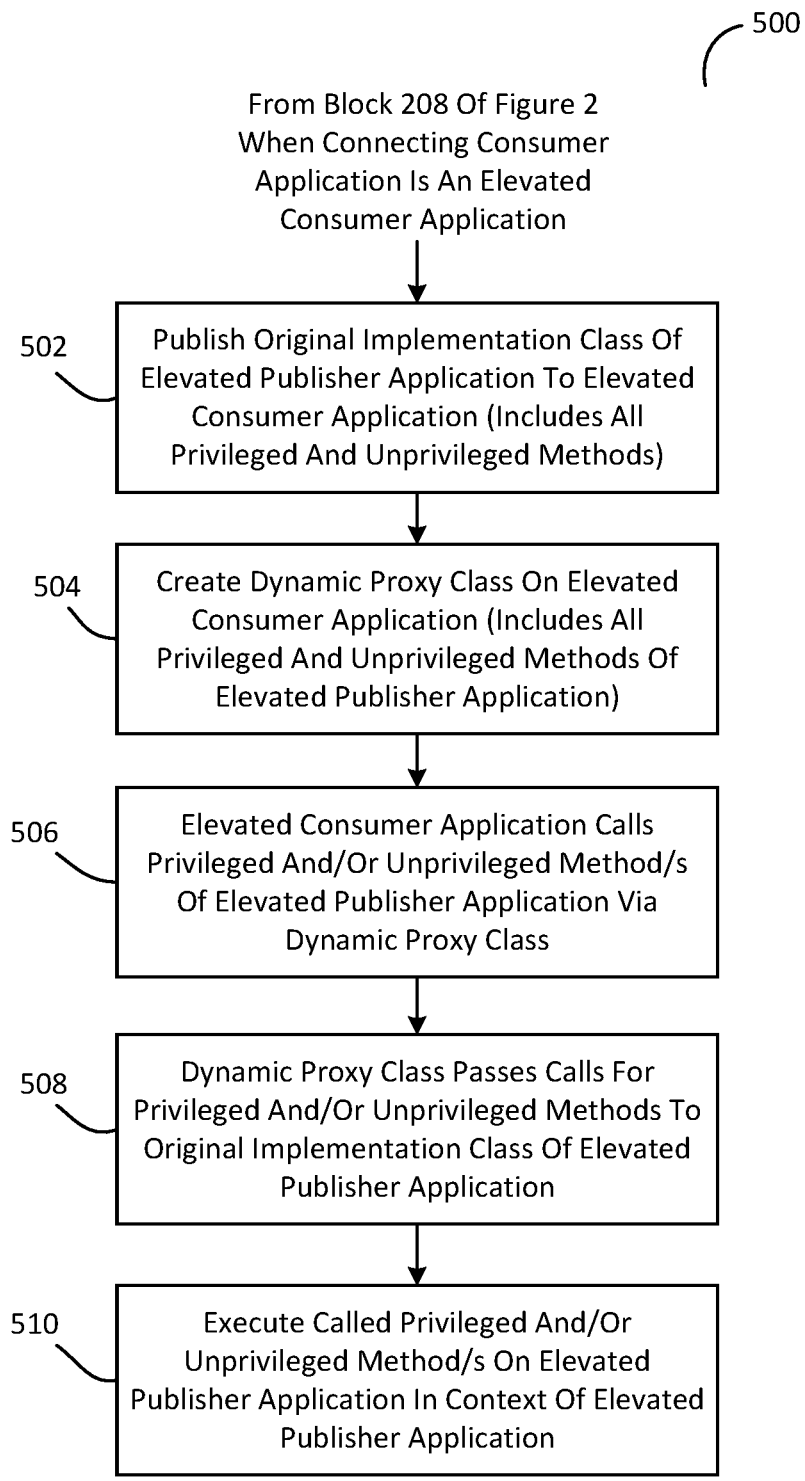
FIG. 5 illustrates a methodology according to one exemplary embodiment of the disclosed systems and methods.
Figure 7:
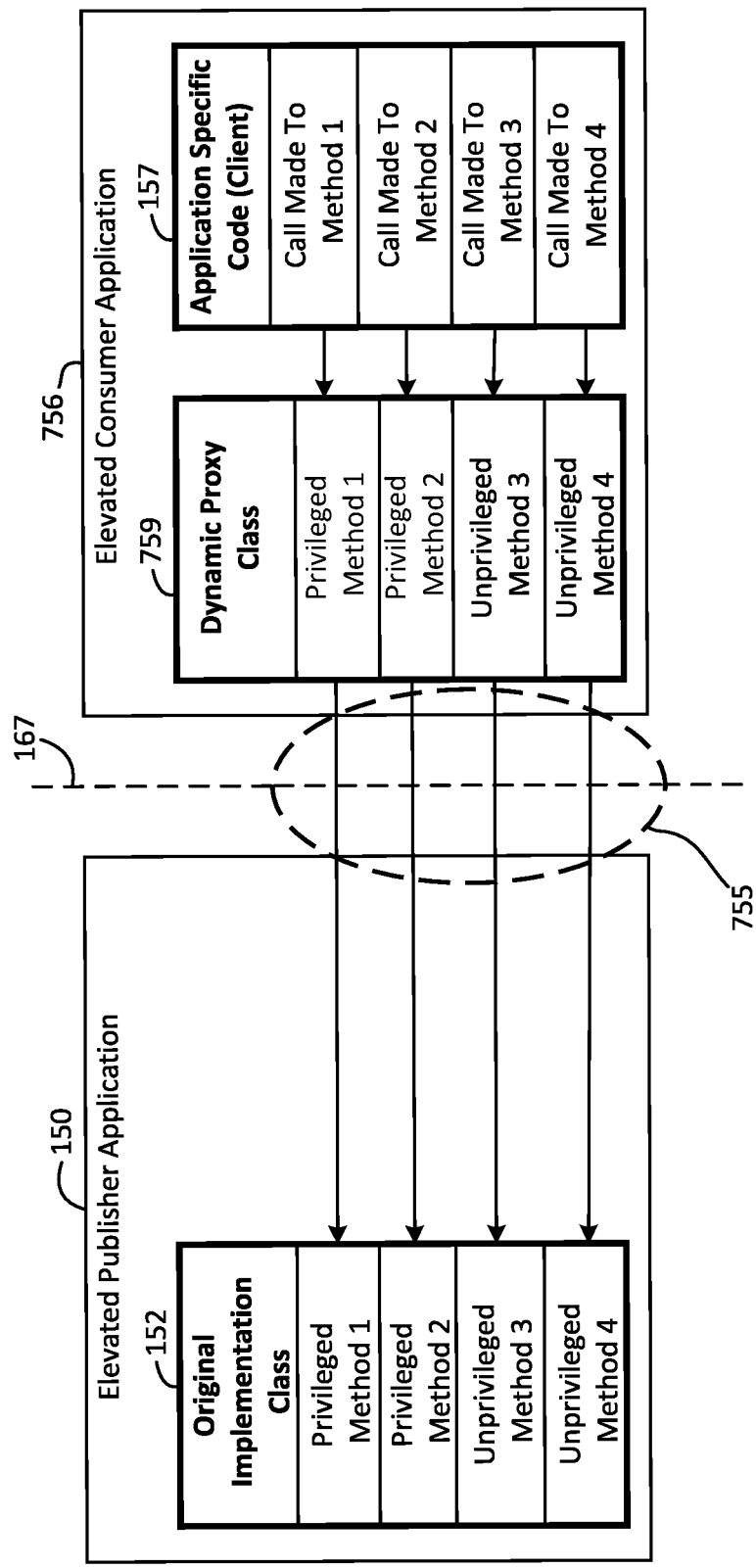
FIG. 7 illustrates an elevated publisher application and an elevated consumer application according to one exemplary embodiment of the disclosed systems and methods.

FIG. 5 illustrates one exemplary embodiment of a methodology 500 that may be implemented when elevated publisher application 150 determines in block 208 of FIG. 2 that the current connecting application is an elevated consumer application 756 that is connecting by an elevated IPC 755 as shown in FIG. 7. In block 502 of methodology 500, the original implementation class 152 (i.e., including all its privileged and unprivileged methods) is published by elevated publisher application 150 to elevated consumer application 756 of FIG. 7 via the elevated IPC connection 755, e.g., as remote procedure calls. In block 504, a dynamic proxy class 759 that includes all privileged and unprivileged methods of the original implementation class 152 is then created on elevated consumer application 756 during runtime. Thus, elevated consumer application 756 is enabled to invoke any of the methods (both privileged and privileged) that are published by elevated publisher application 150.

Next, in block 506, application code 757 of elevated consumer application 756 invokes or makes calls (e.g., remote procedure calls) via dynamic proxy class 759 across elevated IPC connection 755 for privileged and/or unprivileged method/s on elevated publisher application 150.

Then, in block 508, the call/s made in block 506 for privileged or unprivileged method/s of original implementation class 152 are passed to original implementation class 152, and are then executed in the context of the elevated publisher application 150 in block 510 for the exemplary embodiment of FIG. 7.

Figure 6:
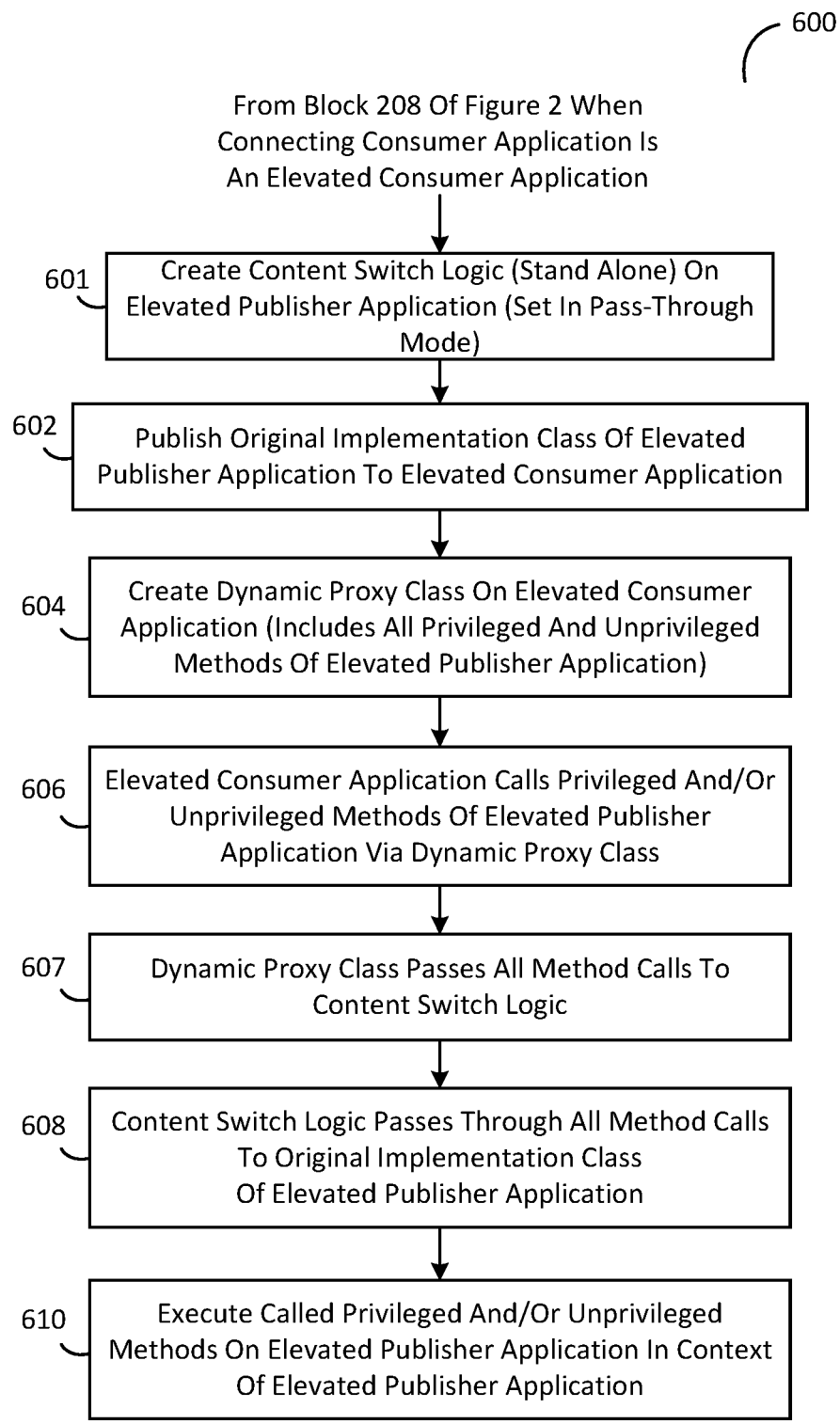
FIG. 6 illustrates a methodology according to one exemplary embodiment of the disclosed systems and methods.
Figure 8:
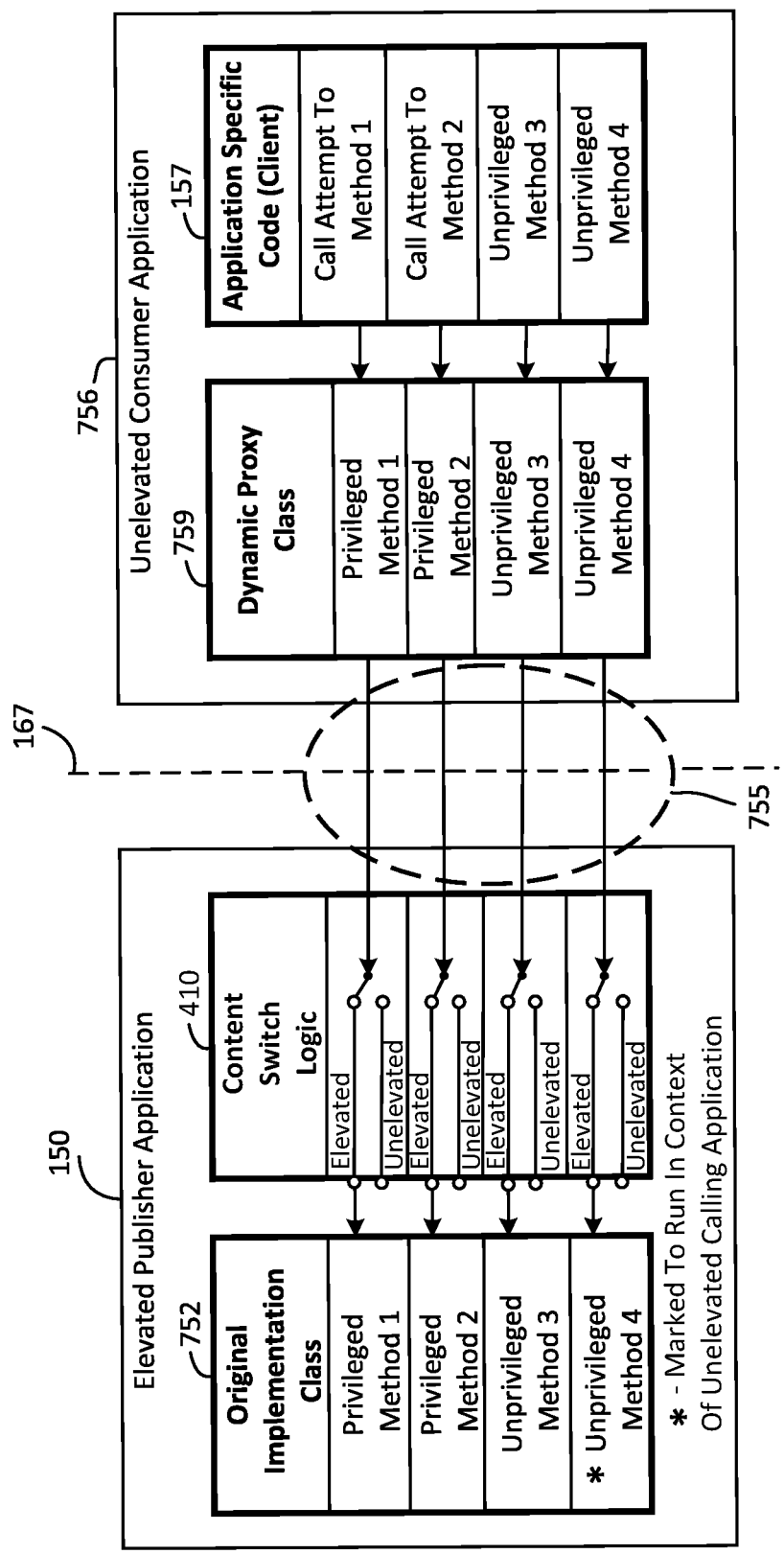
FIG. 8 illustrates an elevated publisher application and an elevated consumer application according to one exemplary embodiment of the disclosed systems and methods.

FIG. 6 illustrates another exemplary embodiment of a methodology 600 that may be implemented when elevated publisher application 150 determines in block 208 of FIG. 2 that the current connecting application is an elevated application 156 that is connecting by an elevated IPC 755 as shown in FIG. 8. In this alternate embodiment of FIGS. 6 and 8, context switch logic 410 is created and implemented alone during runtime by elevated publisher application 150 (i.e., without the presence of dynamic publisher object 753) in block 601 of methodology 600 when the connecting application 156 is determined in block 208 to be an elevated application (otherwise the implementation would be as shown and described in relation to FIG. 4 when the connecting application 156 is determined in block 208 to be an unelevated application). When the connecting application 156 is so determined in block 208 to be an elevated application, context switch logic 410 is switched (set) in block 601 to a "pass-through" mode so as to pass through all calls made from elevated application 156 in unmodified form to any privileged or unprivileged methods of original implementation class 752 so that all called methods are executed in the elevated context of elevated publisher application 150 (i.e., regardless of markings in original implementation class 152 for execution of any methods in the calling context).

Although FIGS. 6 and 8 illustrate an exemplary embodiment where context switch logic 410 may be created and implemented alone without the presence of dynamic publisher object 753, it will be understood that in an alternative embodiment, context switch logic 410 may only be created and implemented as an integral part of dynamic publisher object 753 by elevated publisher application 150. In this alternative embodiment, all calls made from elevated application 156 pass through in unmodified form to any privileged or unprivileged methods of original implementation class 752 since no dynamic publisher object 753 or context logic 410 is present, and therefore all called methods are executed in the elevated context of elevated publisher application 150 (i.e., regardless of markings in original implementation class 152 for execution of any methods in the calling context), e.g., in a manner similar to that illustrated in FIG. 7.

Returning now to block 602 of methodology 600 of FIG. 6, the original implementation class 752 is published by elevated publisher application 150 to elevated consumer application 756 of FIG. 8 via the elevated IPC connection 755, e.g., as remote procedure calls. In block 604, a dynamic proxy class 759 that includes all privileged and unprivileged methods of the corresponding published original implementation class 152 is then created on elevated consumer application 756 during runtime.

Next, in block 606, application code 757 of elevated consumer application 756 invokes or makes calls (e.g., remote procedure calls) via dynamic proxy class 759 for privileged and/or unprivileged method/s on elevated publisher application 150. Then, in block 607, the call/s made in block 606 for privileged or unprivileged method/s of original implementation class 152 are passed across elevated IPC connection 755 to context switch logic 410 from dynamic proxy class 759.

Next, in block 608, context switch logic 410 of elevated publisher application 150 passes through (i.e., without modification) the calls received from dynamic proxy class 759 of elevated consumer application 756 to original implementation class 152, and these called methods are then executed on elevated publisher application 150 in the context of the elevated publisher application 150 in block 610 (e.g., for the exemplary embodiment of FIG. 8).

It will be understood that the methodologies of FIGS. 2, 5 and 6 are exemplary only, and that any other combination of additional, fewer and/or alternative steps may additionally or alternatively be employed to automatically control access of calls (e.g., remote procedure calls) made over IPCs or named pipes with optional calling context impersonation.

Additional information regarding example techniques that may be optionally implemented with some embodiments of the disclosed systems and methods may be found described in U.S. patent application Ser. No. 17/231,384 filed on Apr. 15, 2021, which is incorporated herein by reference in its entirety for all purposes.

It will also be understood that one or more of the tasks, functions, or methodologies described herein (e.g., including those described herein for components 101, 102, 110, 120, 121, 125, 130, 131, 140, 150, 156, 157, 159, 160, 163, 166, 170, 171, 175, 180, 190, etc.) may each be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising using at least one programmable integrated circuit to:
    execute an elevated publisher application and a consumer application, the elevated publish application communicating with the consumer application via an inter-process communication (IPC) connection with the consumer application;
    execute the elevated publisher application to load an original implementation class of the elevated publisher application, one or more methods of the elevated publisher application being marked by the original implementation class to be unprivileged methods that are eligible for exposure to an unelevated consumer application;
    execute the consumer application to attempt a call across the IPC connection for at least a given one of the methods of the elevated publisher application; and
    then respond to the attempted call by the consumer application for the at least one given method of the elevated publisher application by either:
        invoking the at least one given method on the elevated publisher application if the consumer application is an elevated consumer application, or
        invoking the at least one given method on the elevated publisher application if the consumer application is an unelevated consumer application only if the at least one given method on the elevated publisher application is one of the unprivileged methods included in the dynamic proxy class that is determined to be marked as eligible for exposure to the unelevated consumer application.

2. The method of claim 1, where the consumer application is an unelevated consumer application; and where the method further comprises executing the at least one programmable circuit to:
    determine which methods of the original implementation class are marked by the original implementation class to be unprivileged methods that are eligible for exposure to the unelevated consumer application; and
    then dynamically create a dynamic publisher object on the elevated publisher application to include only those unprivileged methods determined to be marked as eligible for exposure to the unelevated consumer application only when methods of the original implementation class are determined to be marked by the original implementation class to be unprivileged methods that are eligible for exposure to the unelevated consumer application.

3. The method of claim 2, where the elevated publisher application is an elevated service application; where the unelevated consumer application is an antivirus software application or a client user interface; and where the IPC connection is an unelevated IPC connection.

4. The method of claim 1, where the consumer application is an unelevated consumer application; and where the method further comprises executing the at least one programmable circuit to:
    determine which methods of the original implementation class are marked by the original implementation class to be unprivileged methods that are eligible for exposure to the unelevated consumer application;
    dynamically create during runtime a dynamic publisher object on the elevated publisher application to only include the unprivileged methods determined to be marked as eligible for exposure to the unelevated consumer application;
    publish an interface of the dynamic publisher object from the elevated publisher application to the unelevated consumer application, and then dynamically create during runtime the interface of the dynamic publisher object as a dynamic consumer proxy class on the unelevated consumer application, the dynamic consumer proxy class only including the unprivileged methods determined to be marked as eligible for exposure to the unelevated consumer application;
    then execute the unelevated consumer application to attempt a call via the dynamic consumer proxy class across the IPC connection for the at least a given one of the methods of elevated publisher application; and
    then respond to the attempted call by the unelevated consumer application for the at least one given method of the elevated publisher application only if it is one of the methods included in the dynamic proxy class by:
        using the dynamic consumer proxy class of the unelevated consumer application to call the at least one given method across the IPC connection from the dynamic publisher object of the elevated publisher application, and
        then using the dynamic publisher object of the elevated publisher object to respond to the call from the dynamic consumer proxy class of the unelevated consumer application by invoking the at least one given method on the elevated publisher application.

5. The method of claim 4, where the method further comprises executing the at least one programmable circuit to respond to the attempted call by the unelevated consumer application for the at least one given method of the elevated publisher application only if it is not one of the methods included in the dynamic proxy class by failing the attempted call and generating an exception.

6. The method of claim 4, where the using the dynamic publisher object of the elevated publisher object to respond to the call for the at least one given method of the elevated publisher application from the dynamic consumer proxy class of the unelevated consumer application comprises invoking execution of the at least one given method on the elevated publisher application; and where the method further comprises executing the at least one given method on the elevated publisher application.

7. The method of claim 6, where the method further comprises executing the at least one given method on the elevated publisher application by default in a context of the elevated publisher application.

8. The method of claim 6, where one or more methods of the elevated publisher application are marked by the original implementation class for execution in a context of the unelevated consumer application; and where the using the dynamic publisher object of the elevated publisher object to respond to the call for the at least one given method of the elevated publisher application from the dynamic consumer proxy class of the unelevated consumer application comprises:
   determining whether the at least one given method of the elevated publisher application is marked by the original implementation class for execution in a context of the unelevated consumer application;
   then executing the at least one given method on the elevated publisher application in a context of the elevated publisher application only if the at least one given method of the elevated publisher application is determined not to be marked by the original implementation class for execution in the context of the unelevated consumer application, and
   then executing the at least one given method on the elevated publisher application in a context of the unelevated publisher application only if the at least one given method of the elevated publisher application is determined to be marked by the original implementation class for execution in the context of the unelevated consumer application.

9. The method of claim 1, further comprising executing the elevated publisher application and the consumer application on the same host programmable integrated circuit of an information handling system.

10. The method of claim 1, where each of the one or more methods of the elevated publisher application is an application programming interface (API).

11. A system, comprising at least one programmable integrated circuit that is programmed to:
   execute an elevated publisher application and a consumer application, the elevated publish application communicating with the consumer application via an inter-process communication (IPC) connection with the consumer application;
   execute the elevated publisher application to load an original implementation class of the elevated publisher application, one or more methods of the elevated publisher application being marked by the original implementation class to be unprivileged methods that are eligible for exposure to an unelevated consumer application;
   execute the consumer application to attempt a call across the IPC connection for at least a given one of the methods of the elevated publisher application; and
   then respond to the attempted call by the consumer application for the at least one given method of the elevated publisher application by either:
      invoking the at least one given method on the elevated publisher application if the consumer application is an elevated consumer application, or
      invoking the at least one given method on the elevated publisher application if the consumer application is an unelevated consumer application only if the at least one given method on the elevated publisher application is one of the unprivileged methods included in the dynamic proxy class that is determined to be marked as eligible for exposure to the unelevated consumer application.

12. The system of claim 11, where the consumer application is an unelevated consumer application; and where the at least one programmable integrated circuit is programmed to:
   determine which methods of the original implementation class are marked by the original implementation class to be unprivileged methods that are eligible for exposure to the unelevated consumer application; and
   then dynamically create a dynamic publisher object on the elevated publisher application to include only those unprivileged methods determined to be marked as eligible for exposure to the unelevated consumer application only when methods of the original implementation class are determined to be marked by the original implementation class to be unprivileged methods that are eligible for exposure to the unelevated consumer application.

13. The system of claim 12, where the elevated publisher application is an elevated service application; where the unelevated consumer application is an antivirus software application or a client user interface; and where the IPC connection is an unelevated IPC connection.

14. The system of claim 11, where the consumer application is an unelevated consumer application; and where the at least one programmable integrated circuit is programmed to:
   determine which methods of the original implementation class are marked by the original implementation class to be unprivileged methods that are eligible for exposure to the unelevated consumer application;
   dynamically create during runtime a dynamic publisher object on the elevated publisher application to include only those unprivileged methods determined to be marked as eligible for exposure to the unelevated consumer application;
   publish an interface of the dynamic publisher object from the elevated publisher application to the unelevated consumer application, and then dynamically create during runtime the interface of the dynamic publisher object as a dynamic consumer proxy class on the unelevated consumer application, the dynamic consumer proxy class only including the unprivileged methods determined to be marked as eligible for exposure to the unelevated consumer application;
   then execute the unelevated consumer application to attempt a call via the dynamic consumer proxy class across the IPC connection for the at least a given one of the methods of elevated publisher application; and
   then respond to the attempted call by the unelevated consumer application for the at least one given method of the elevated publisher application only if it is one of the methods included in the dynamic proxy class by:
      using the dynamic consumer proxy class of the unelevated consumer application to call the at least one given method across the IPC connection from the dynamic publisher object of the elevated publisher application, and
      then using the dynamic publisher object of the elevated publisher object to respond to the call from the dynamic consumer proxy class of the unelevated consumer application by invoking the at least one given method on the elevated publisher application.

15. The system of claim 14, where the at least one programmable integrated circuit is programmed to respond to the attempted call by the unelevated consumer application for the at least one given method of the elevated publisher application only if it is not one of the methods included in the dynamic proxy class by failing the attempted call and generating an exception.

16. The system of claim 14, where the at least one programmable integrated circuit is programmed to use the dynamic publisher object of the elevated publisher object to respond to the call for the at least one given method of the elevated publisher application from the dynamic consumer proxy class of the unelevated consumer application by:
  invoking execution of the at least one given method on the elevated publisher application; and
  executing the at least one given method on the elevated publisher application.

17. The system of claim 16, where the at least one programmable integrated circuit is programmed to execute the at least one given method on the elevated publisher application by default in a context of the elevated publisher application.

18. The system of claim 16, where one or more methods of the elevated publisher application are marked by the original implementation class for execution in a context of the unelevated consumer application; and where the at least one programmable integrated circuit is programmed to use the dynamic publisher object of the elevated publisher object to respond to the call for the at least one given method of the elevated publisher application from the dynamic consumer proxy class of the unelevated consumer application by:
  determining whether the at least one given method of the elevated publisher application is marked by the original implementation class for execution in a context of the unelevated consumer application;
  then executing the at least one given method on the elevated publisher application in a context of the elevated publisher application only if the at least one given method of the elevated publisher application is determined not to be marked by the original implementation class for execution in the context of the unelevated consumer application, and
  then executing the at least one given method on the elevated publisher application in a context of the unelevated publisher application only if the at least one given method of the elevated publisher application is determined to be marked by the original implementation class for execution in the context of the unelevated consumer application.

19. The system of claim 11, where the system is an information handling system and where at least one programmable integrated circuit is a host programmable integrated circuit of the information handling system, the host programmable integrated circuit being programmed to execute both the elevated publisher application and the consumer application.

20. The system of claim 11, where each of the one or more methods of the elevated publisher application is an application programming interface (API).

* * * * *